(12) United States Patent
Xu

(10) Patent No.: US 11,576,202 B2
(45) Date of Patent: Feb. 7, 2023

(54) RANDOM ACCESS METHOD AND APPARATUS

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 58 days.

(21) Appl. No.: 17/149,253

(22) Filed: Jan. 14, 2021

(65) Prior Publication Data

US 2021/0136813 A1     May 6, 2021

Related U.S. Application Data

(63) Continuation of application No. PCT/CN2019/097877, filed on Jul. 26, 2019.

(30) Foreign Application Priority Data

Jul. 27, 2018 (CN) .......................... 201810846923.7

(51) Int. Cl.
     *H04W 74/00*     (2009.01)
     *H04L 1/00*     (2006.01)
     (Continued)

(52) U.S. Cl.
CPC ......... *H04W 74/004* (2013.01); *H04L 1/0003* (2013.01); *H04L 27/2607* (2013.01); *H04W 74/0833* (2013.01)

(58) Field of Classification Search
CPC .............. H04W 74/00; H04W 74/002; H04W 74/004; H04W 74/008; H04W 74/08;
(Continued)

(56) References Cited

U.S. PATENT DOCUMENTS 11,497,051 B2 * 11/2022 Lin ..................... H04W 74/004
2017/0367120 A1   12/2017 Murray et al.
(Continued)

FOREIGN PATENT DOCUMENTS

CN     108282901 A    7/2018
EP      3346777 A2    7/2018
(Continued)

OTHER PUBLICATIONS

International Search Report with English Translation for PCT/CN2019/097877 dated Oct. 28, 2019.
(Continued)

*Primary Examiner* — Warner Wong
(74) *Attorney, Agent, or Firm* — Young Basile Hanlon & MacFarlane, P.C.

(57) ABSTRACT

A random access method and apparatus, the method comprising: a terminal device sending a first message to a network device, the first message including a random access preamble and uplink information; the random access preamble occupies at least one first symbol in the time domain, and the uplink information occupies at least one second symbol in the time domain, the one first symbol comprises a first cyclic prefix (CP) and at least one first information segment, and the one second symbol comprises a second CP and at least one second information segment. The random access method and apparatus of an implementation of the present disclosure may reduce signaling overhead during random access.

22 Claims, 5 Drawing Sheets

(51) Int. Cl.
*H04L 27/26* (2006.01)
*H04W 74/08* (2009.01)

(58) Field of Classification Search
CPC .......... H04W 74/0833; H04L 27/2678; H04L 27/413; H04L 1/0003; H04L 1/004; H04L 1/005; H04L 27/2602; H04L 27/2605; H04L 27/2607; H04L 12/2856; H04L 12/413; H04L 2012/5603
See application file for complete search history.

(56) References Cited

U.S. PATENT DOCUMENTS

| | | | |
|---|---|---|---|
| 2018/0124822 A1 | 5/2018 | Wang et al. | |
| 2019/0036753 A1* | 1/2019 | Wu | H04L 5/0041 |
| 2019/0037411 A1* | 1/2019 | Wu | H04W 16/14 |
| 2019/0098671 A1* | 3/2019 | Lin | H04W 74/0833 |
| 2019/0116610 A1* | 4/2019 | Byun | H04L 27/2613 |
| 2019/0349985 A1* | 11/2019 | Lin | H04L 5/0053 |
| 2020/0022173 A1* | 1/2020 | Luo | H04W 72/042 |
| 2020/0068620 A1* | 2/2020 | Kim | H04W 74/006 |
| 2020/0343938 A1* | 10/2020 | Medina Acosta | H04W 74/0833 |
| 2020/0374925 A1* | 11/2020 | Su | H04W 74/008 |

FOREIGN PATENT DOCUMENTS

| | | |
|---|---|---|
| EP | 3537832 A1 | 9/2019 |
| WO | 2018084618 A1 | 5/2018 |

OTHER PUBLICATIONS

3GPP TSG RAN WG1 NR Ad Hoc; Spokane, Washington, USA, Jan. 16-20, 2017; R1-1700892.

3GPP TSG RAN WG1 AH_NR Meeting; Spokane, USA, Jan. 16-20, 2017; R1-1700186.

Extended European Search Report for EP Application 19841289.2 dated Aug. 11, 2021. (10 pages).

* cited by examiner

RANDOM ACCESS METHOD AND APPARATUS

CROSS-REFERENCE TO RELATED APPLICATION(S)

The present application is a continuation application of International PCT Application No. PCT/CN2019/097877 having an international filing date of Jul. 26, 2019, which claims priority to Chinese Patent Application No. 201810846923.7 filed on Jul. 27, 2018. The present application claims priority and the benefit of the above-identified applications and the above-identified applications are incorporated by reference herein in their entireties.

TECHNICAL FIELD

Implementations of the present disclosure relate to the field of communication technology, and more particularly, to the random access method and apparatus.

BACKGROUND

Random access is the most basic function that a cellular system has, which makes it possible to establish a communication connection between a terminal device and a network device. In a new radio (NR) system (or called 5G system or 5G network), a four-step random access procedure similar to that of Long Term Evolution (LTE) is adopted, however, the signaling overhead of the traditional four-step random access procedure is relatively large.

Therefore, how to reduce the signaling overhead of a random access procedure is an urgent problem to be solved.

SUMMARY

Implementations of the present disclosure provide methods and devices for random access, which can reduce the signaling overhead of a random access procedure.

In a first aspect, there is provided a method for random access, which includes: a terminal device sends a first message to a network device, the first message including a random access preamble and uplink information, the random access preamble occupying at least one first symbol in the time domain, and the uplink information occupying at least one second symbol in the time domain, wherein one first symbol includes one first cyclic prefix (CP) and at least one first information segment, and one second symbol includes one second CP and at least one second information segment.

In a second aspect, there is provided a method for random access, which includes: a network device receives a first message sent by a terminal device, the first message including a random access preamble and uplink information, the random access preamble occupying at least one first symbol in the time domain, and the uplink information occupying at least one second symbol in the time domain, wherein one first symbol includes one first cyclic prefix (CP) and at least one first information segment, and one second symbol includes one second CP and at least one second information segment.

In a third aspect, there is provided a terminal device for performing the method according to the first aspect described above or various implementations thereof.

Specifically, the terminal device includes function modules for performing the method according to the first aspect described above or various implementations thereof.

In a fourth aspect, there is provided a network device for performing the method according to the second aspect described above or various implementations thereof.

Specifically, the network device includes function modules for performing the method according to the second aspect described above or various implementations thereof.

In a fifth aspect, there is provided a terminal device including a processor and a memory. The memory is used for storing a computer program, and the processor is used for calling and running the computer program stored in the memory to perform the method according to the first aspect described above or various implementations thereof.

In a sixth aspect, there is provided a network device including a processor and a memory. The memory is used for storing a computer program, and the processor is used for calling and running the computer program stored in the memory to perform the method according to the second aspect described above or various implementations thereof.

In a seventh aspect, there is provided a chip for implementing the method according to any of the first aspect and the second aspect described above or various implementations thereof.

Specifically, the chip includes a processor used for calling and running a computer program from a memory, so that a device with the chip installed therein performs the method according to any of the first aspect and the second aspect described above or various implementations thereof.

In an eighth aspect, there is provided a computer readable storage medium used for storing a computer program that causes a computer to perform the method according to any of the first aspect and the second aspect described above or various implementations thereof.

In a ninth aspect, there is provided a computer program product including computer program instructions that cause a computer to perform the method according to any of the first aspect and the second aspect described above or various implementations thereof.

In a tenth aspect, there is provided a computer program, which, when running on a computer, causes the computer to perform the method according to any of the first aspect and the second aspect described above or various implementations thereof.

Through the technical scheme described above, in a random access procedure, the same message sent by the terminal device to the network device can include the random access preamble and a Physical Uplink Shared Channel (PUSCH), avoiding sending the random access preamble and the PUSCH to the network device using two pieces of signaling, thereby reducing the signaling overhead of the random access procedure.

DETAILED DESCRIPTION

Technical solutions in implementations of the present disclosure will be described below with reference to the drawings in the implementations of the present disclosure. It is apparent that the implementations described are just some of the implementations of the present disclosure, but not all of the implementations of the present disclosure. According to the implementations of the present disclosure, all other implementations achieved by a person of ordinary skill in the art without making inventive efforts are within the protection scope of the present disclosure.

The technical solutions in the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, a LTE Time Division Duplex (TDD) system, an advanced long term evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunications System (UMTS), a Worldwide Interoperability for Microwave Access (WiMAX) communication system, a Wireless Local Area Network (WLAN), Wireless Fidelity (WiFi), a next generation communication system or other communication systems, etc.

Figure 1:
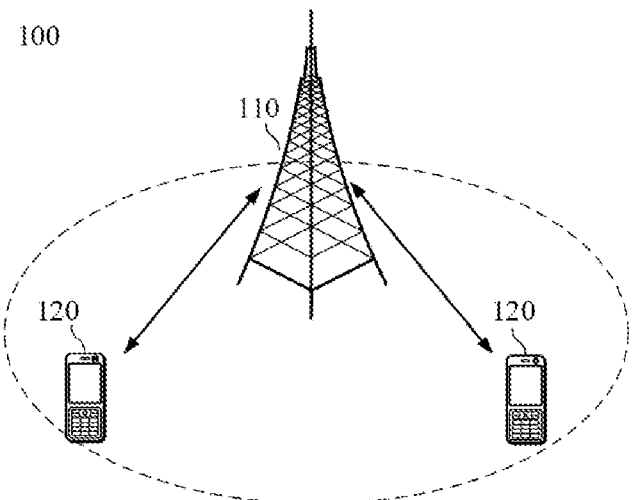
FIG. 1 is a schematic diagram of an architecture of a communication system according to an implementation of the present disclosure.

Illustratively, a communication system 100 applied in an implementation of the present disclosure is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, or a NodeB (NB) in a WCDMA system, or an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 also includes at least one terminal device 120 located within the coverage area of the network device 110. The "terminal device" as used herein includes, but not limited to, a device configured to receive/send communication signals via a wired circuit, for example, via a public switched telephone network (PSTN), a digital subscriber line (DSL), a digital cable, a direct cable; and/or via another data connection/network; and/or via a wireless interface, for instance, for a cellular network, a wireless local area network (WLAN), a digital television network such as a digital video broadcasting-handheld (DVB-H) network, a satellite network, and an amplitude modulation-frequency modulation (AM-FM) broadcast transmitter; and/or another terminal device; and/or an Internet of Things (IoT) device. A terminal device configured to communicate via a wireless interface may be referred to as "a wireless communication terminal", "a wireless terminal" or "a mobile terminal". Examples of the mobile terminal include, but not limited to, a satellite or cellular telephone; a personal communication system (PCS) terminal capable of combining a cellular wireless telephone with data processing, facsimile, and data communication abilities; a personal digital assistant (PDA) that may include a radio telephone, a pager, internet/intranet access, a Web browser, a memo pad, a calendar, a Global Positioning System (GPS) receiver; and a conventional laptop and/or palmtop receiver or other electronic devices including a radio telephone transceiver. The terminal device may refer to an access terminal, user equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN), or the like.

Optionally, device to device (D2D) communication may be established between the terminal devices 120.

FIG. 1 illustrates schematically one network device and two terminal devices. Optionally, the wireless communication system 100 may include multiple network devices, and other quantities of terminal devices may be included within the coverage area of each network device, which are not limited in the implementations of the present disclosure.

Optionally, the communication system 100 may include other network entities, such as a network controller and a mobile management entity, which are not limited in the implementations of the present disclosure.

It should be understood that a device with a communication function in a network/system in the implementations of the present disclosure may be referred to as a communication device. Taking the communication system 100 shown in FIG. 1 as an example, the communication device may include a network device 110 and a terminal device 120 which have communication functions, and the network device 110 and the terminal device 120 may be the specific devices described above, and will not be described repeatedly herein. The communication device may also include other devices in the communication system 100, such as other network entities, such as network controllers and mobile management entities, which are not limited in the implementations of the present disclosure.

In order to facilitate understanding of the schemes of the implementations of the present disclosure, a four-step random access procedure and a two-step random access procedure based on contention will be described below with reference to FIGS. 2 and 3.

It should be noted that the implementations of the present disclosure are described only by taking random access based on contention as an example, but the present disclosure is not limited thereto, and the implementations of the present disclosure can also be applied to random access based on non-contention.

Figure 2:
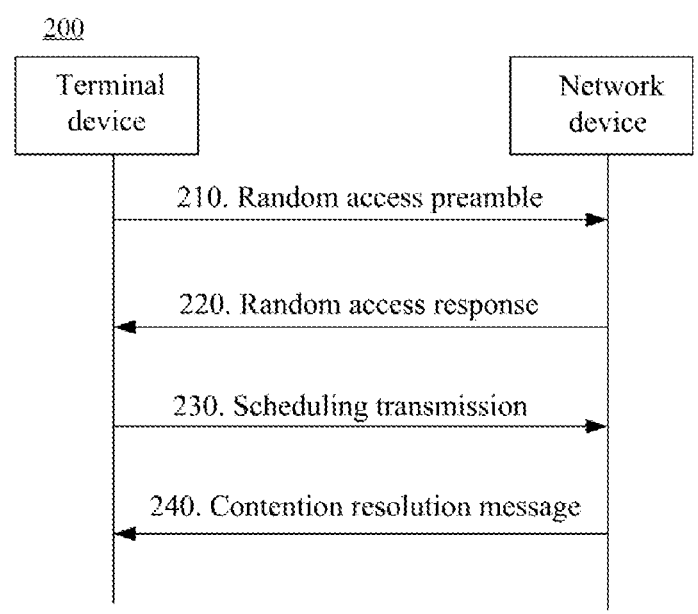
FIG. 2 is a schematic flow chart of a four-step random access method according to an implementation of the present disclosure.

FIG. 2 is a schematic flow chart of a four-step random access method.

In 210, a terminal device sends a random access preamble, i.e., message 1 (MSG1), on a random access channel to a network device.

In 220, after detecting the random access preamble sent by the terminal device, the network device sends a random access response (RAR), i.e., message 2 (MSG2), to the terminal device to inform the terminal device of uplink resource information that can be used when a message 3 (MSG3) is sent.

Time alignment (TA) information and a radio network temporary identifier (RNTI) may be carried in the RAR.

Optionally, the MSG2 may be generated by a media access control (MAC) layer of the network device. One MSG2 can correspond to responses to random access requests of multiple terminal devices simultaneously.

In 230, after receiving the MSG2, the terminal device determines whether it belongs to its own RAR, and sends the message 3 (MSG3) in the uplink resource specified by the MSG2 when determining that it belongs to its own RAR, the MSG3 carrying temporary identification information specific to the terminal device.

In 240, after receiving the MSG3, the network device may send a message 4 (MSG4) to the terminal device. The MSG4 includes a contention resolution message and an uplink transmission resource allocated by the network device to the terminal device.

After receiving the MSG4, the terminal device can detect whether the specific temporary identification information carried in the MSG3 is contained in the contention resolution message sent by the network device. If yes, it is indicated that the random access procedure of the terminal device is successful; otherwise, it is considered that the random access process has failed and the terminal device needs to initiate the random access procedure from the first step again.

Optionally, the MSG4 may be generated by a radio resource control layer of the network device.

The time delay of the four-step random access procedure is relatively large, which is not suitable for low-delay and high-reliability scenarios in 5G. Considering characteristics of related services with low delay and high reliability, a scheme for the two-step random access procedure is proposed. In the two-step random access procedure, to be brief, the first and third steps of the four-step random access procedure are merged into a first step of the two-step random access procedure, and the second and fourth steps of the four-step random access procedure are merged into a second step of the two-step random access procedure.

Figure 3:
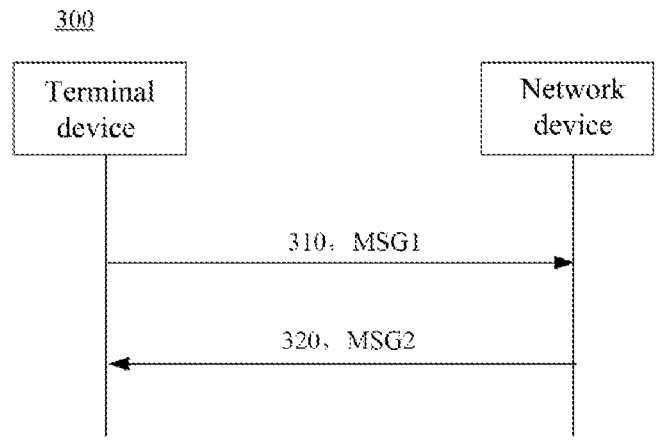
FIG. 3 is a schematic flow chart of a two-step random access method according to an implementation of the present disclosure.

FIG. 3 is a schematic diagram of a two-step random access procedure according to an implementation of the present disclosure.

In 310, a terminal device sends a MSG1 to a network device. The MSG1 includes a preamble and a Physical Uplink Shared Channel (PUSCH). The PUSCH may carry identification information specific to the terminal device.

In 320, the network device sends a random access response MSG2 to the terminal device. The MSG2 may carry TA information, a temporary RNTI, and a contention resolution message, wherein the contention resolution message may include the identification information of the terminal device.

It should be understood that the method 300 shown in FIG. 3 is only one specific implementation of the two-step random access procedure, and should not limit the protection scope of the present disclosure.

Figure 4:
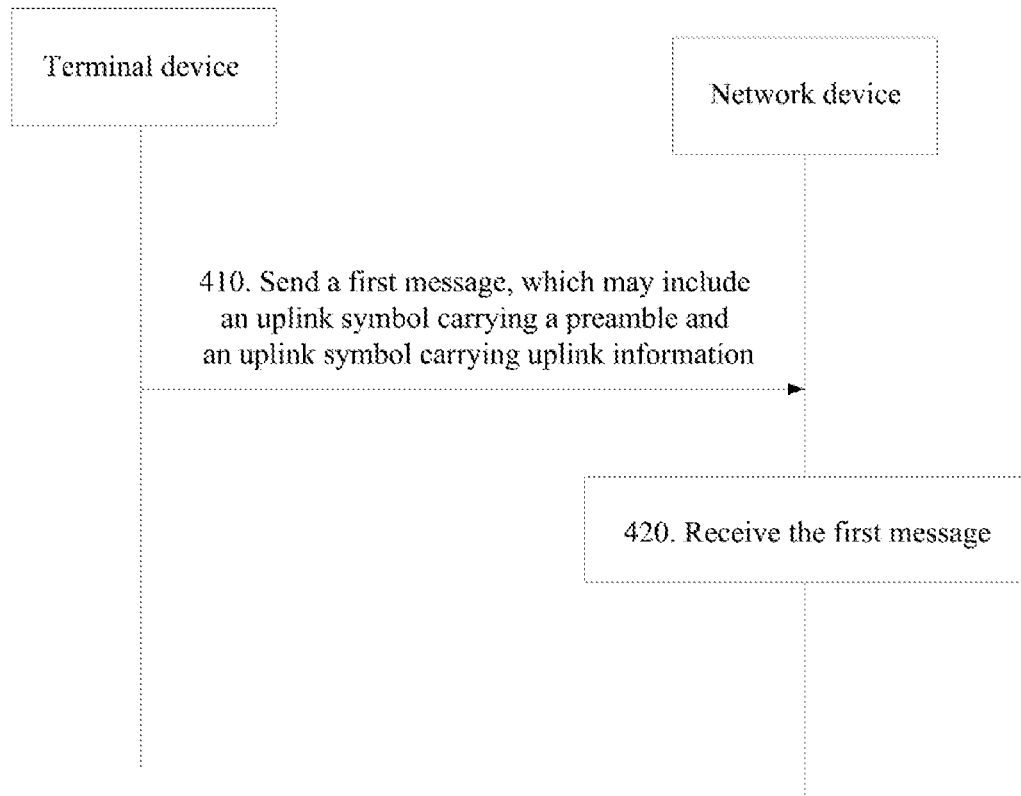
FIG. 4 is a schematic flowchart of a method for random access according to an implementation of the present disclosure.

FIG. 4 is a schematic flow chart of a method 400 for random access according to an implementation of the present disclosure, wherein the method can be executed by a terminal device and can be applied to the 310 in the method 300. The method 400 includes at least part of the following contents.

In 410, the terminal device sends a first message, which may include an uplink symbol carrying a preamble and an uplink symbol carrying uplink information, to a network device. The 410 may correspond to the 310 in the method 300.

In 420, the network device receives the first message sent by the terminal device. The 420 may correspond to the 320 in the method 300.

The first message including the uplink symbol carrying the preamble and the uplink symbol carrying the uplink information can be understood as the first message including the preamble and the uplink information.

It should be understood that the uplink symbol carrying the uplink information can be a PUSCH, a Physical Uplink Control Channel (PUCCH), or other uplink channels or uplink reference signals that can be used to transmit the uplink information, which is not limited in the present disclosure.

For convenience of description, in the implementations of the present disclosure, the uplink symbol carrying the uplink information is the PUSCH as an example for illustration. However, it should be understood that without a conflict, the following PUSCH can also be directly replaced by other uplink channels or reference signals carrying the uplink information, such as the PUCCH.

The preamble occupies at least one first symbol in the time domain, and the PUSCH occupies at least one second symbol in the time domain. One first symbol includes one first cyclic prefix (CP) and at least one first information segment, and one second symbol includes one second CP and at least one second information segment.

Optionally, in the implementation of the present disclosure, each of the first symbols may include at least one first CP and a plurality of identical first information segments. The quantity of the first CPs is smaller than the quantity of the first information segments. Optionally, each of the first symbols may include one first CP and a plurality of identical information segments.

Likewise, each of the second symbols may include at least one second CP and a plurality of identical second information segments. The quantity of second CPs is smaller than the quantity of second information segments. Optionally, each of the second symbols may include one second CP and a plurality of identical second information segments.

The quantity of CPs is smaller than the quantity of information segments, so the CP overhead during PUSCH transmission can be saved.

It should be understood that the first message includes the preamble and the PUSCH can mean that between the preamble and the PUSCH sent by the terminal device to the network device, there is no other message between the network device and the terminal device, and/or the network device can send random access responses for the preamble and PUSCH to the terminal device simultaneously.

Optionally, in the implementation of the present disclosure, the same information segments can mean that contents in the information segments are the same and expression forms of the information segments are the same. That is, a first information segment in each first symbol can be repeated at least once, and a second information segment in each second symbol can be repeated at least once.

Optionally, the preamble and the PUSCH are in Frequency Division Multiplexing (FDM) or Time Division Multiplexing (TDM).

In the implementation of the present disclosure, there may be various positional relationships between the first symbol and the second symbol, which are not specifically limited in the implementation of the present disclosure.

Optionally, the first symbol and the second symbol may or may not be adjacent in the time domain.

For example, the first symbol may precede the second symbol in the time domain.

For example, the first symbol may follow the second symbol in the time domain.

It should be understood that the sequential relationship of the first symbol and the second symbol in the implementation of the present disclosure represents a logical relationship, and there may be other symbols between the first symbol and the second symbol, in which case the first symbol and the second symbol are not adjacent.

Optionally, time domain positions of the first symbol and the second symbol may be the same, and their frequency domain positions may be different.

Optionally, in the PUSCH, the quantities of CPs and/or information segments included in different symbols may be the same or different.

For example, the first symbol of the PUSCH includes one CP and two identical information segments, and the second symbol includes one CP and three identical information segments.

For another example, the first symbol of the PUSCH includes two CPs and two identical information segments, and the second symbol includes one CP and two identical information segments.

For another example, the first symbol of the PUSCH includes two CPs and two identical information segments, and the second symbol includes two CPs and two identical information segments.

It should be understood that the term "and/or" herein describes an association relationship between associated objects only, indicating that there may be three relationships, for example, A and/or B may indicate three cases: A alone, A and B, and B alone.

It should be noted that when the PUSCH includes multiple symbols, the signal transmitted on each of the symbols can be the same or different, which is not specifically limited in the implementation of the present disclosure.

Optionally, in the implementation of the present disclosure, the information carried on the PUSCH may include information for distinguishing the terminal device, such as a terminal device identifier, an RNTI, etc. Optionally, if the RNTI is carried on the PUSCH, the RNTI may be selected by the terminal device from a set of RNTIs preconfigured by the network device for two-step RACH transmission.

In this case, there are few information bits carried on the PUSCH, the code rate is low, and the probability that the network device can perform demodulation correctly is high.

Optionally, the information carried on the PUSCH may include information for distinguishing the terminal device and a category to which an event triggering Physical Random Access Channel (PRACH) transmission belongs. The event that triggers the PRACH transmission can include the following.

The terminal device needs to perform initial access.

Or after a radio link has failed, the terminal device needs to reestablish an RRC connection.

Or the terminal device is in an RRC connected state and needs to be handed over from a serving cell to a target cell.

Or the terminal device is in the RRC connected state, but uplink synchronization is not realized, in which case the terminal device sends uplink data or receives downlink data.

Or the terminal device is switched from an RRC deactivated state to the RRC connected state.

Or the terminal device is in the RRC connected state, in which case a positioning process needs to be performed, but the terminal device does not have TA.

Or the terminal device requests other system information (OSI).

Or the terminal device needs to perform recovery from beam failure.

In this case, optionally, the terminal device may use a plurality of bits to indicate the category to which the event triggering the PRACH transmission belongs. For example, three bits can be used to indicate the category to which the event triggering the PRACH transmission belongs: "000" indicates that the terminal device needs to perform the initial access, "001" indicates that the terminal device needs to reestablish the RRC connection, "010" indicates that the terminal device needs to perform cell handover, . . . , and "111" indicates that the terminal device needs to perform the recovery from the beam failure.

Optionally, the information carried on the PUSCH may include the information for distinguishing the terminal device, the category to which the event triggering the PRACH transmission belongs, and further information that needs to be transmitted to complete this event.

Illustratively, for the initial access of the terminal device, three bits "000" may be used to indicate that the terminal device needs to perform the initial access. In addition, other bits may be used to indicate further information that needs to be transmitted to complete the initial access, such as an RRC connection request generated by the RRC layer.

Illustratively, for connection re-establishment, 3 bits "001" can be used to indicate that the terminal device needs to re-establish the RRC connection, and other bits can also be used to indicate an RRC connection re-establishment request generated by the RRC layer.

Illustratively, for the cell handover of the terminal device, three bits "010" can be used to indicate that the terminal device needs to perform the cell handover, and other bits can also be used to indicate an RRC handover completion message generated by the RRC layer.

Further, the information carried on the PUSCH may also include, but is not limited to, a scheduling request (SR), a buffer status report (BSR), and service data.

Optionally, a subcarrier spacing of the preamble and a subcarrier spacing of the PUSCH may be the same.

For example, the subcarrier spacing of the preamble is 15 kHZ and the subcarrier spacing of the PUSCH is also 15 kHZ.

For another example, the subcarrier spacing of the preamble is 30 kHZ and the subcarrier spacing of the PUSCH is also 30 kHZ.

Optionally, the subcarrier spacing of the preamble and the subcarrier spacing of the PUSCH may be different.

For example, the subcarrier spacing of the preamble is 15 kHZ and the subcarrier spacing of the PUSCH is 30 kHZ.

For another example, the subcarrier spacing of the preamble is 60 kHZ and the subcarrier spacing of the PUSCH is 30 kHZ.

Optionally, the length of the first CP and the length of the second CP may be the same.

In this case, processing of the network device is relatively simple.

Optionally, when the network device can estimate timing according to the preamble and process the PUSCH according to the estimated timing, the length of the first CP and the length of the second CP may be different. For example, the length of the first CP may be greater than that of the second CP.

In one implementation, the quantity of second information segments may be determined based on the quantity of first information segments.

For the terminal side, after determining the quantity of the first information segments, the terminal device can obtain the quantity of the second information segments based on the quantity of the first information segments.

For the network side, the quantity of the first information segments can be known in advance, or after the preamble is received, the quantity of the first information segments can be known, and the quantity of the second information segments can be determined based on the quantity of the first information segments.

Or the quantity of the first information segments may be determined based on the quantity of the second information segments.

For the terminal side, after determining the quantity of the second information segments, the terminal device can obtain the quantity of the first information segments based on the quantity of the second information segments.

For the network side, the quantity of the second information segments can be known in advance, or after the uplink information is received, the quantity of the second information segments can be known, and the quantity of the first information segments can be determined based on the quantity of the second information segments.

As an example, the ratio between the quantity of the first information segments and the quantity of the second information segments being a first preset value can be understood as: the quantity of the second information segments/the quantity of the first information segments=the first preset value, or the quantity of the first information segments/the quantity of the second information segments=the first preset value.

Optionally, the first preset value may be preset by the system.

When the quantity of the first information segments is known, the terminal device or the network device can determine the quantity of the second information segments based on the quantity of the first information segments and the first preset value preset by the system.

Or when the quantity of the second information segments is known, the terminal device or the network device may determine the quantity of the first information segments based on the quantity of the second information segments and the first preset value preset by the system.

Optionally, the first preset value may be determined by the network device.

After the network device determines the first preset value, it can send information indicating the first preset value to the terminal device. After receiving the information, the terminal device can obtain the first preset value.

Optionally, the first preset value may be determined by the terminal device.

Optionally, the first preset value may be determined based on at least one of the code rate of the PUSCH, the modulation and coding scheme (MCS) of the PUSCH and the amount of frequency domain resources of the PUSCH.

The terminal device can determine the first preset value based on at least one of the code rate of the PUSCH, the modulation and coding scheme of the PUSCH and the amount of frequency domain resources of the PUSCH.

Of course, the network device may also determine the first preset value based on at least one of the code rate of the PUSCH, the modulation and coding scheme of the PUSCH and the amount of frequency domain resources of the PUSCH, and then the network device may send indication information indicating the first preset value to the terminal device. After receiving the indication information, the terminal device can obtain the first preset value.

Or the network device or the terminal device each may determine the first preset value based on at least one of the code rate of the PUSCH, the modulation and coding scheme of the PUSCH and the amount of frequency domain resources of the PUSCH.

It should be understood that the method of determining the first preset value based on at least one of the code rate of the PUSCH, the modulation and coding scheme of the PUSCH and the amount of frequency domain resources of the PUSCH is not specifically limited in the implementation of the present disclosure, and any algorithm that can determine the first preset value based on at least one of the code rate of the PUSCH, the modulation and coding scheme of the PUSCH and the amount of frequency domain resources of the PUSCH is covered in the protection scope of the present disclosure.

In an example, the first preset value may be a positive integer. That is, the quantity of the second information segments is a multiple of the quantity of the first information segments, or the quantity of the first information segments is a multiple of the quantity of the second information segments.

For example, the first preset value can be 1; if the quantity of the first information segments is P and the quantity of the second information segments is N, then N=P.

For example, the first preset value can be 2, that is, N=2*P, or P=2*N.

As an example, the difference between the quantity of the second information segments and the quantity of the first information segments being a second preset value can be understood as: the quantity of the second information segments−the quantity of the first information segments=the second preset value, or the quantity of the first information segments−the quantity of the second information segments=the second preset value.

In an example, the second preset value may be a positive integer.

For example, the second preset value may be 1; if the quantity of the first information segments is P and the quantity of the second information segments is N, then N=P−1, or P=N−1.

It should be noted that the method of determining the second preset value can refer to the method of determining the first preset value, and will not be repeated herein for brevity.

In an implementation, the quantity of the second information segments may be determined based on an identifier of the preamble. This operation can be implemented by the terminal device or the network device.

Optionally, the identifier of the preamble may be carried in the first message.

Optionally, the identifier of the preamble may have a corresponding relationship with the quantity of the second information segments. The terminal device or the network device may determine the quantity of the second information segments based on the corresponding relationship between the identifier of the preamble and the quantity of the second information segments as well as the identifier of the preamble.

The corresponding relationship between the identifier of the preamble and the quantity of the second information segments can be a one-to-one relationship, that is, the identifier of one preamble can correspond to one quantity of second information segments.

Or the corresponding relationship between the identifier of the preamble and the quantity of the second information segments can be a multiple-to-one relationship, that is, multiple identifiers of the preamble can correspond to one quantity of second information segments.

For example, candidate preambles are divided into N groups, each group of preambles including multiple preambles, and each group of preambles corresponding to one quantity of second information segments.

The determination of the corresponding relationship between the identifier of the preamble and the second information segments may refer to the method of determining the first preset value, and will not be described in detail herein in order to avoid repetition.

Optionally, the preambles that can be used can be represented as multiple groups, and the quantity of the second information segments can be determined based on the quantity of the preambles in each group.

For example, there are three preambles that can be used, the first and third preambles are represented as the first group, and the second preamble is represented as the second group. When the first preamble is used, the terminal device or the network device can determine the quantity of the second information segments according to the quantity of the preambles in the first group; when the second preamble is used, the terminal device or the network device can determine the quantity of the second information segments according to the quantity of the preambles in the second group.

In an implementation, the quantity of the second information segments may be determined based on a format corresponding to the preamble. This operation can be implemented by the terminal device or the network device.

Optionally, the format corresponding to the preamble may be determined based on a PRACH configuration index.

Optionally, the quantity of the second information segments may have a corresponding relationship with the format corresponding to the preamble, and the terminal device or network device may determine the quantity of the second information segments according to the corresponding relationship between the quantity of the second information segments and the format corresponding to the preamble.

In an implementation, the quantity of the second information segments may be determined according to at least one of the code rate of the PUSCH, the MCS of the PUSCH and the amount of frequency domain resources of the PUSCH. This operation can be implemented by the terminal device or the network device.

Optionally, the smaller the code rate of the PUSCH is, the larger the quantity of the second information segments is.

Optionally, the smaller the level of the MCS of the PUSCH is, the larger the quantity of the second information segments is.

For example, when the level of the MCS of the PUSCH is 2, the quantity of the second information segments is 4; when the level of the MCS of the PUSCH is 4, the quantity of the second information segments is 2.

Optionally, the smaller the amount of frequency domain resources of the PUSCH is, the larger the quantity of the second information segments is.

For example, the PUSCH occupies two resource blocks (RBs) in the frequency domain, and the quantity of the second information segments is 2; the PUSCH occupies 1 RB in the frequency domain, and the quantity of the second information segments is 4; the PUSCH occupies 4 RBs in the frequency domain, and the quantity of the second information segments is 1.

In an implementation, the quantity of the second information segments may be preset according to a standard or preconfigured by the network device.

Optionally, the network device may determine the quantity of the second information segments according to the current network situation, such as network congestion. Afterward, before the terminal device sends the first message, the network device may send configuration information to the terminal device to indicate the quantity of the second information segments to the terminal device.

It should be understood that the method of determining the quantity of the first information segments can refer to the method of determining the quantity of the second information segments, and will not be repeated herein.

In the implementation of the present disclosure, in one implementation, the quantity of second symbols occupied by the PUSCH in the time domain may be determined based on the quantity of first symbols occupied by the preamble in the time domain. This operation can be implemented by the terminal device or the network device.

As an example, the ratio between the quantity of the second symbols and the quantity of the first symbols being a third preset value can be understood as: the quantity of the second symbols/the quantity of the first symbols=the third preset value, or the quantity of the first symbols/the quantity of the second symbols=the third preset value.

As an example, the difference between the quantity of the second symbols and the quantity of the first symbols being a fourth preset value can be understood as: the quantity of the second symbols−the quantity of the first symbols=the fourth preset value, or the quantity of the first symbols−the quantity of the second symbols=the fourth preset value.

In an implementation, the quantity of the second symbols occupied by the PUSCH in the time domain may be determined based on the identifier of the preamble. This operation can be implemented by the terminal device or the network device.

In an implementation, the quantity of the second symbols occupied by the PUSCH in the time domain may be determined based on a format corresponding to the preamble. This operation can be implemented by the terminal device or the network device.

In an implementation, the quantity of the second symbols occupied by the PUSCH in the time domain can be preset according to a standard or preconfigured by the network device.

In an implementation, the quantity of the second symbols occupied by the PUSCH in the time domain may be determined according to at least one of the code rate of the PUSCH, the modulation and coding scheme of the PUSCH and the amount of frequency domain resources of the PUSCH. This operation can be implemented by the terminal device or the network device.

It should be understood that although the method for determining the quantity of the second information segments and the method for determining the quantity of the second symbols have been described above respectively, it does not mean that the method for determining the quantity of the second information segments and the method for determining the quantity of the second symbols are independent of each other. The method for determining the quantity of the second symbols can refer to the method for determining the quantity of the second information segments; of course, the method for determining the quantity of the first symbols can also refer to the method for determining the quantity of the second information segments.

As a possible implementation, the method according to the implementation of the present disclosure may further include: the terminal device determines a random access transmission format from a plurality of random access transmission formats. In this case, the terminal device can send the first message to the network device according to the determined random access transmission format.

Or the network device may determine the random access transmission format from a plurality of random access transmission formats. And further, the network device can configure the determined random access transmission format to the terminal device.

Optionally, the random access transmission format may represent information such as the quantity of symbols occupied by the preamble or the PUSCH in the time domain, the quantity of information segments included in each symbol and the length of the CP, and the subcarrier spacing of the preamble or the PUSCH.

For different random access transmission formats, at least one of the following is different: the length of the first CP, the length of the second CP, the quantity of the first symbols and the quantity of the first information segments in the first symbols, the quantity of the second symbols and the quantity of the second information segments in the second symbols.

Optionally, in the implementation of the present disclosure, the random access transmission formats may include transmission formats of the preamble and transmission formats of the PUSCH. If the transmission formats of the preamble and/or the transmission formats of the PUSCH are different, the random access transmission formats are different; or if the random access transmission formats are different, the transmission formats of the preamble and/or the transmission formats of the PUSCH are different.

Figure 5:
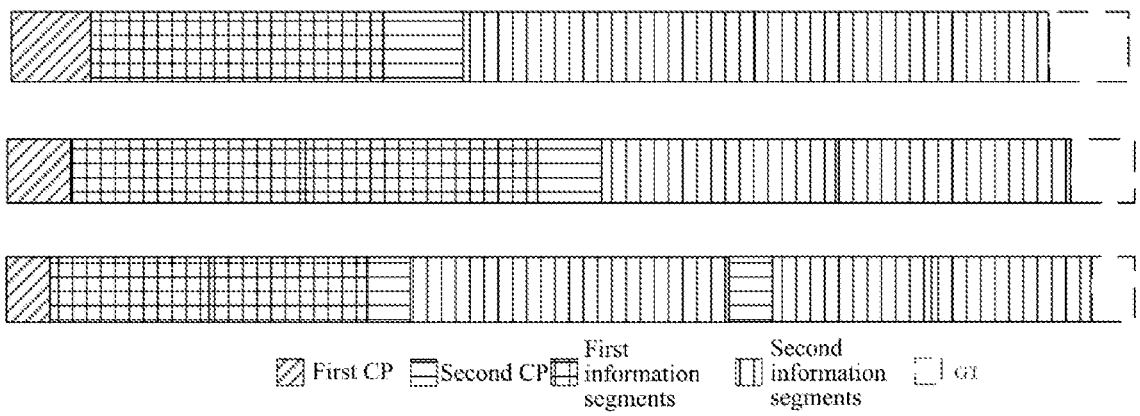
FIG. 5 is a schematic diagram of a plurality of random access transmission formats according to an implementation of the present disclosure.

FIG. 5 is a schematic diagram of three random access transmission formats. In FIG. 5, different patterns represent different contents. M represents the quantity of second symbols, N represents the quantity of second information segments, and P represents the quantity of first information segments.

In the upper figure, a preamble occupies a symbol in the time domain, and the symbol includes one first CP and one first information segment; a PUSCH occupies a symbol in the time domain, and the symbol includes one second CP and two identical second information segments, namely M=1, N=2 and P=1. In the middle figure, a preamble occupies a symbol in the time domain, and the symbol includes one first CP and two identical second information segments; a PUSCH occupies a symbol in the time domain, and the symbol includes one second CP and two identical second information segments, namely M=1, N=2 and P=2. In the lower figure, a preamble occupies a symbol in the time domain, and the symbol includes one first CP and two identical first information segments; a PUSCH occupies two symbols in the time domain, and each of the symbols includes one second CP and two identical information segments, namely M=2, N=2 and P=2. It should be understood that different information can be transmitted on different symbols, and multiple information segments of the same symbol transmit the same information.

It can be seen that in the upper figure and the middle figure of FIG. 5, the transmission formats of the PUSCH part are the same, and the quantities of the second information segments in the preamble part are different, that is, the transmission formats of the preamble part are different. Therefore, the random access transmission formats of the upper figure and the middle figure of FIG. 5 are different.

It can also be seen by comparing the middle figure with the lower figure of FIG. 5 that the transmission formats of the preamble part are the same, and the quantities of the second symbols in the PUSCH part occupied by the PUSCH in the time domain are different, that is, the transmission formats of the PUSCH part are different. Therefore, the random access transmission formats of the middle figure and the lower figure of FIG. 5 are different.

It can also be seen by comparing the upper figure with the lower figure of FIG. 5 that both the transmission formats of the preamble part and the transmission formats of the PUSCH part are different, so the random access transmission formats of the upper figure and the lower figure of FIG. 5 are different.

As an example, the terminal device may select a random access transmission format from a plurality of random access transmission formats.

Optionally, the terminal device may randomly select one random access transmission format from the plurality of random access transmission formats.

Optionally, the terminal device may select a random access transmission format from the plurality of random access transmission formats based on a certain parameter. For example, the parameter may be the quantity of the first information segments, the quantity of the second symbols or the quantity of the second information segments.

As an example, the network device may select a random access transmission format from the plurality of random access transmission formats. Then, the network device sends indication information indicating the random access transmission format to the terminal device, and the terminal device can determine the random access transmission format after receiving the indication information.

As a possible implementation, the random access transmission format used by the terminal device for sending the first message currently is different from the random access transmission format used for sending the first message at least once previously.

Optionally, the quantity of the second information segments corresponding to the random access transmission format used for sending the first message currently may be larger than the quantity of the second information segments corresponding to the random access transmission format used for sending the first message at least once previously.

As a possible implementation, the random access transmission format used by the terminal device for sending the first message each time may be the same.

After the network device receives the first message sent by the terminal device, the network device may send a second message to the terminal device.

The second message includes a random access response which carries an uplink resource allocated by the network device to the terminal device and a contention resolution message.

It should be understood that if the information carried on the PUSCH includes the information for distinguishing the terminal device and the category to which the event triggering the PRACH transmission belongs, the uplink resource allocated by the network device to the terminal device can be more accurate.

It should be noted that the technical scheme of the implementation of the present disclosure can also be applied to the four-step random access procedure, and the specific implementation can refer to the implementation of the two-step random access described above and will not be repeated herein.

In the implementation of the present disclosure, in the random access procedure, the same message sent by the terminal device to the network device can include the random access preamble and the PUSCH, avoiding sending the random access preamble and the PUSCH to the network device using two pieces of signaling, thereby reducing the signaling overhead of the random access procedure.

It should be understood that in various implementations of the present disclosure, sequence numbers in various processes described above do not imply an order of execution of the various processes, which should be determined by their functions and internal logics, and should not constitute any limitation on implementation processes of the implementations of the present disclosure.

The methods for random access according to the implementations of the present disclosure have been described in detail above, and devices for random access according to implementations of the present disclosure will be described below with reference to FIGS. 6 to 8. Technical features described in the method implementations are applicable to following device implementations.

Figure 6:
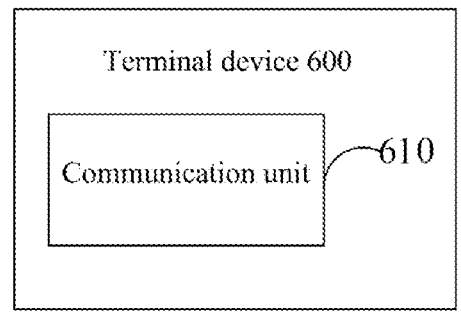
FIG. 6 is a schematic block diagram of a terminal device according to an implementation of the present disclosure.

FIG. 6 shows a schematic block diagram of a terminal device 600 according to an implementation of the present disclosure. As shown in FIG. 6, the terminal device 600 includes a communication unit 610.

The communication unit 610 is configured to send a first message to a network device, the first message including a random access preamble and uplink information, the random access preamble occupying at least one first symbol in the time domain and the uplink information occupying at least one second symbol in the time domain, wherein one first symbol includes one first cyclic prefix (CP) and at least one first information segment, and one second symbol includes one second CP and at least one second information segment.

Optionally, in the implementation of the present disclosure, each of the at least one second symbol includes one second CP and a plurality of identical second information segments.

Optionally, in the implementation of the present disclosure, the quantity of second information segments in the second symbol is determined based on the quantity of first information segments in the first symbol.

Or the quantity of the second information segments in the second symbol is determined based on an identifier of the random access preamble.

Or the quantity of the second information segments in the second symbol is determined based on a format corresponding to the random access preamble.

Or the quantity of the second information segments in the second symbol is preset according to a standard or preconfigured by the network device.

Or the quantity of the second information segments in the second symbol is determined according to at least one of the code rate of the uplink information, the modulation and coding scheme (MCS) of the uplink information and the amount of frequency domain resources of the uplink information.

Optionally, in the implementation of the present disclosure, the quantity of the second information segments in the second symbol is determined based on the quantity of the first information segments in the first symbol.

The ratio between the quantity of the second information segments and the quantity of the first information segments is a first preset value.

Or the difference between the quantity of the second information segments and the quantity of the first information segments is a second preset value.

Optionally, in the implementation of the present disclosure, the quantity of second symbols occupied by the uplink information in the time domain is determined based on the quantity of first symbols occupied by the random access preamble in the time domain.

Or the quantity of the second symbols occupied by the uplink information in the time domain is determined based on the identifier of the random access preamble.

Or the quantity of the second symbols occupied by the uplink information in the time domain is determined based on the format corresponding to the random access preamble.

Or the quantity of the second symbols occupied by the uplink information in the time domain is preset according to a standard or preconfigured by the network device.

Or the quantity of the second symbols occupied by the uplink information in the time domain is determined according to at least one of the code rate of the uplink information, the modulation and coding scheme (MCS) of the uplink information and the amount of frequency domain resources of the uplink information.

Optionally, in the implementation of the present disclosure, the quantity of the second symbols occupied by the uplink information in the time domain is determined based on the quantity of the first symbols occupied by the random access preamble in the time domain.

The ratio between the quantity of the second symbols and the quantity of the first symbols is a third preset value.

The difference between the quantity of the second symbols and the quantity of the first symbols is a fourth preset value.

Optionally, in the implementation of the present disclosure, the length of the first CP and the length of the second CP are the same.

Optionally, in the implementation of the present disclosure, the length of the first CP is greater than that of the second CP.

Optionally, in the implementation of the present disclosure, the terminal device 600 may further include a processing unit 620 configured to determine a random access transmission format from a plurality of random access transmission formats, wherein at least one of the following is different for different random access transmission formats: the length of the first CP, the quantity of the second symbols occupied by the uplink information in the time domain, the quantity of the first information segments in the first symbol and the quantity of the second information segments in the second symbol.

The communication unit 610 is further configured to send the first message to the network device according to the determined random access transmission format.

Optionally, in the implementation of the present disclosure, the random access transmission format used for sending the first message currently is different from the random access transmission format used for sending the first message at least once previously.

For different random access transmission formats, at least one of the following is different: the length of the first CP, the quantity of the second symbols occupied by the uplink information in the time domain, the quantity of the first information segments in the first symbol and the quantity of the second information segments in the second symbol.

Optionally, in the implementation of the present disclosure, a subcarrier spacing of the random access preamble is the same as that of the uplink information.

Optionally, in the implementation of the present disclosure, the uplink information includes at least one of an identifier of the terminal device 600, an SR, a BSR and service data.

It should be understood that the terminal device 600 may correspond to the terminal device in the method 400, and may implement the corresponding operations performed by the terminal device in the above method 400, which will not be repeated herein for brevity.

Figure 7:
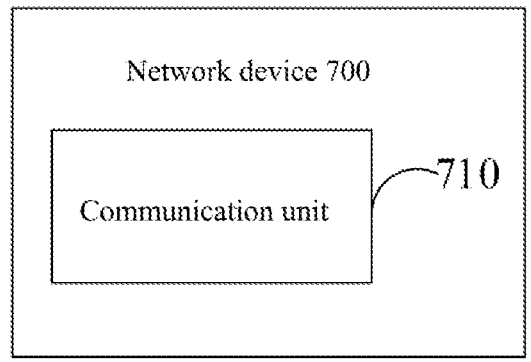
FIG. 7 is a schematic block diagram of a network device according to an implementation of the present disclosure.

FIG. 7 shows a schematic block diagram of a network device 700 according to an implementation of the present disclosure. As shown in FIG. 7, the terminal device 700 includes a communication unit 710.

The communication unit 710 is configured to receive a first message sent by the terminal device, the first message including a random access preamble and uplink information, the random access preamble occupying at least one first symbol in the time domain and the uplink information occupying at least one second symbol in the time domain, wherein one first symbol includes one first cyclic prefix (CP) and at least one first information segment, and one second symbol includes one second CP and at least one second information segment.

Optionally, in the implementation of the present disclosure, each of the at least one second symbol includes one second CP and a plurality of identical second information segments.

Optionally, in the implementation of the present disclosure, the quantity of second information segments in the second symbol is determined based on the quantity of first information segments in the first symbol.

Or the quantity of the second information segments in the second symbol is determined based on an identifier of the random access preamble.

Or the quantity of the second information segments in the second symbol is determined based on a format corresponding to the random access preamble.

Or the quantity of the second information segments in the second symbol is preset according to a standard or preconfigured by the network device.

Or the quantity of the second information segments in the second symbol is determined according to at least one of the code rate of the uplink information, the modulation and coding scheme (MCS) of the uplink information and the amount of frequency domain resources of the uplink information.

Optionally, in the implementation of the present disclosure, the quantity of the second information segments in the second symbol is determined based on the quantity of the first information segments in the first symbol.

The ratio between the quantity of the second information segments and the quantity of the first information segments is a first preset value.

Or the difference between the quantity of the second information segments and the quantity of the first information segments is a second preset value.

Optionally, in the implementation of the present disclosure, the quantity of second symbols occupied by the uplink information in the time domain is determined based on the quantity of first symbols occupied by the random access preamble in the time domain.

Or the quantity of the second symbols occupied by the uplink information in the time domain is determined based on the identifier of the random access preamble.

Or the quantity of the second symbols occupied by the uplink information in the time domain is determined based on the format corresponding to the random access preamble.

Or the quantity of the second symbols occupied by the uplink information in the time domain is preset according to a standard or preconfigured by the network device.

Or the quantity of the second symbols occupied by the uplink information in the time domain is determined according to at least one of the code rate of the uplink information, the modulation and coding scheme (MCS) of the uplink information and the amount of frequency domain resources of the uplink information.

Optionally, in the implementation of the present disclosure, the quantity of the second symbols occupied by the uplink information in the time domain is determined based on the quantity of the first symbols occupied by the random access preamble in the time domain.

The ratio between the quantity of the second symbols and the quantity of the first symbols is a third preset value.

The difference between the quantity of the second symbols and the quantity of the first symbols is a fourth preset value.

Optionally, in the implementation of the present disclosure, the length of the first CP and the length of the second CP are the same.

Optionally, in the implementation of the present disclosure, the length of the first CP is greater than that of the second CP.

Optionally, in the implementation of the present disclosure, the network device 700 may further include a processing unit 720 configured to determine a random access transmission format from a plurality of random access transmission formats, wherein at least one of the following is different for different random access transmission formats: the length of the first CP, the quantity of the second symbols occupied by the uplink information in the time domain, the quantity of the first information segments in the first symbol and the quantity of the second information segments in the second symbol.

The communication unit 710 may be further configured to send configuration information to the terminal device, the configuration information including the determined random access transmission format.

Optionally, in the implementation of the present disclosure, a subcarrier spacing of the random access preamble is the same as that of the uplink information.

Optionally, in the implementation of the present disclosure, the uplink information includes at least one of an identifier of the terminal device, an SR, a BSR and service data.

It should be understood that the network device 700 may correspond to the network device in the method 400, and may implement the corresponding operations performed by the network device in the above method 400, which will not be repeated herein for brevity.

Figure 8:
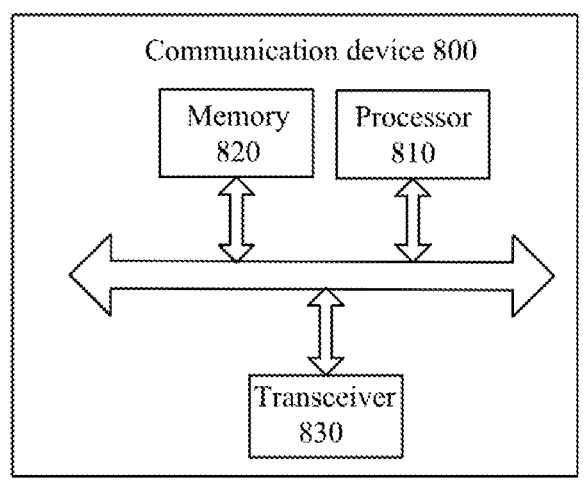
FIG. 8 is a schematic block diagram of a communication device according to an implementation of the present disclosure.

FIG. 8 is a schematic structure diagram of a communication device 800 according to an implementation of the present disclosure. The communication device 800 shown in FIG. 8 includes a processor 810. The processor 810 may call and run a computer program from a memory to implement the methods in the implementations of the present disclosure.

Optionally, as shown in FIG. 8, the terminal device 800 may further include a memory 820. The processor 810 may call and run a computer program from the memory 820 to implement the methods in the implementations of the present disclosure.

The memory 820 may be a separate device independent of the processor 810 or may be integrated in the processor 810.

Optionally, as shown in FIG. 8, the terminal device 800 may further include a transceiver 830, and the processor 810 may control the transceiver 830 to communicate with other devices. Specifically, the transceiver 630 may send information or data to other devices or receive information or data sent by other devices.

The transceiver 830 may include a transmitter and a receiver. The transceiver 830 may further include antennas, the quantity of which may be one or more.

Optionally, the communication device 800 may be specifically the network device according to the implementation of the present disclosure, and the communication device 800 may implement the corresponding processes implemented by the network device in various methods in the implementation of the present disclosure, which will not be repeated herein for brevity.

Optionally, the communication device 800 may be specifically the terminal device according to the implementation of the present disclosure, and the communication device 800 may implement the corresponding processes implemented by the terminal device in various methods in the implementations of the present disclosure, which will not be repeated herein for brevity.

Figure 9:
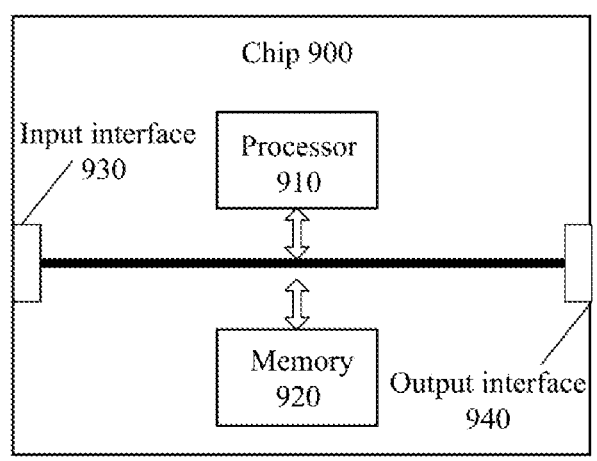
FIG. 9 is a schematic block diagram of a chip according to an implementation of the present disclosure.

FIG. 9 is a schematic structure diagram of a chip according to an implementation of the present disclosure. The chip 900 shown in FIG. 9 includes a processor 910. The processor 910 may call and run a computer program from a memory to implement the methods in the implementations of the present disclosure.

Optionally, as shown in FIG. 9, the chip 900 may further include a memory 920. The processor 910 may call and run a computer program from the memory 920 to implement the methods in the implementations of the present disclosure.

The memory 920 may be a separate device independent of the processor 910 or may be integrated in the processor 910.

Optionally, the chip 900 may further include an input interface 930. The processor 910 may control the input interface 930 to communicate with other devices or chips. Specifically, the processor 710 may acquire information or data sent by other devices or chips.

Optionally, the chip 900 may further include an output interface 940. The processor 910 may control the output interface 940 to communicate with other devices or chips. Specifically, the processor 710 may output information or data to other devices or chips.

Optionally, the chip may be applied to the terminal device in the implementation of the present disclosure, and the chip may implement the corresponding processes implemented by the terminal device in various methods in the implementations of the present disclosure, which will not be repeated herein for brevity.

Optionally, the chip may be applied to the network device in the implementation of the present disclosure, and the chip may implement the corresponding processes implemented by the network device in various methods of the implementation of the present disclosure, which will not be repeated herein for brevity.

It should be understood that the chip mentioned in the implementation of the present disclosure may be referred to as a system-level chip, a system chip, a chip system or a system-on-chip, etc.

It should be understood that the processor in the implementation of the present disclosure may be an integrated circuit chip having a signal processing capability. In an implementation process, the steps of the foregoing method implementations may be implemented through an integrated logic circuit of hardware in the processor or instructions in a form of software. The processor described above may be a general purpose processor, a digital signal processor (DSP), an disclosure specific integrated circuit (ASIC), a field programmable gate array (FPGA) or another programmable logic device, a discrete gate or a transistor logic device, or a discrete hardware component. The processor may implement or perform various methods, steps and logical block diagrams disclosed in the implementations of the present disclosure. The general purpose processor may be a microprocessor, or the processor may also be any conventional processor, or the like. The steps of the methods disclosed in the implementations of the present disclosure may be directly embodied to be implemented by a hardware decoding processor, or may be implemented by a combination of hardware and software modules in the decoding processor. The software modules may be located in a storage medium which is mature in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with its hardware.

It may be understood that the memory in the implementations of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through exemplary but not restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory in the systems and methods described herein is intended to include, but not be limited to, these and any other suitable types of memories.

It should be understood that the foregoing memory is described in an exemplary but non-limiting sense. For example, the memory in the implementations of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memory in the implementations of the present disclosure is intended to include, but not be limited to, these and any other suitable types of memories.

Figure 10:
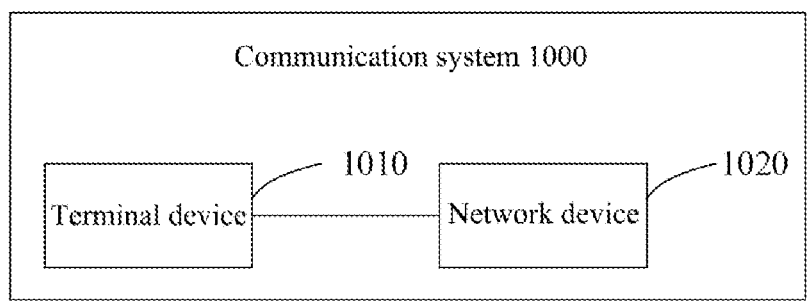
FIG. 10 is a schematic diagram of a communication system according to an implementation of the present disclosure.

FIG. 10 is a schematic block diagram of a communication system 1000 according to an implementation of the present disclosure. As shown in FIG. 10, the communication system 1000 may include a terminal device 1010 and a network device 1020.

The terminal device 1010 can be used to implement the corresponding functions implemented by the terminal device in the above methods, and the network device 1020 can be used to implement the corresponding functions implemented by the network device in the above methods, which will not be repeated herein for brevity.

An implementation of the present disclosure further provides a computer readable storage medium configured to store a computer program.

Optionally, the computer readable storage medium may be applied to the terminal device in the implementation of the present disclosure, and the computer program causes the computer to perform the corresponding processes implemented by the terminal device in various methods in the implementations of the present disclosure, which will not be repeated herein for brevity.

Optionally, the computer readable storage medium may be applied to the network device in the implementation of the present disclosure, and the computer program causes the computer to perform the corresponding processes implemented by the network device in various methods in the implementations of the present disclosure, which will not be repeated herein for brevity.

An implementation of the present disclosure also provides a computer program product including computer program instructions.

Optionally, the computer program product may be applied to the terminal device in the implementation of the present disclosure, and the computer program instructions cause the computer to perform the corresponding processes implemented by the terminal device in various methods in the implementations of the present disclosure, which will not be repeated herein for brevity.

Optionally, the computer program product may be applied to the network device in the implementation of the present disclosure, and the computer program instructions cause the computer to perform the corresponding processes implemented by the network device in various methods in the implementations of the present disclosure, which will not be repeated herein for brevity.

An implementation of the present disclosure also provides a computer program.

Optionally, the computer program may be applied to the terminal device in the implementation of the present disclosure. The computer program, when running on a computer, causes the computer to perform the corresponding processes implemented by the terminal device in various methods in the implementations of the present disclosure, which will not be repeated herein for brevity.

Optionally, the computer program may be applied to the network device in the implementation of the present disclosure. The computer program, when running on a computer, causes the computer to perform the corresponding processes implemented by the network device in various methods in the implementations of the present disclosure, which will not be repeated herein for brevity.

A person of ordinary skill in the art may recognize that the elements and algorithm steps in various examples described in combination with the implementations disclosed herein can be implemented in electronic hardware, or a combination of computer software and electronic hardware. Whether these functions are implemented in hardware or software depends on the specific disclosure and design constraints of the technical solution. Skilled artisans may use different methods to implement the described functions for each particular disclosure, but such implementation should not be considered to be beyond the scope of the present disclosure.

Those skilled in the art may clearly understand that for the sake of convenience and conciseness of description, the specific working processes of the systems, devices and units described above may be described with reference to the corresponding processes in the above method implementations and will not be repeated herein.

In several implementations provided by the present disclosure, it should be understood that the disclosed systems, devices and methods may be implemented in other ways. For example, the device implementations described above are only illustrative, for example, the division of the units is only a logical function division, and there may be other division manners in actual implementation. For example, multiple units or components may be combined or integrated into another system, or some features may be ignored or not executed. In addition, the shown or discussed coupling or direct coupling or communication connection between each other may be an indirect coupling or communication connection through some interfaces, devices or units, or may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present disclosure may be integrated into one processing unit, or may exist physically separately, or two or more than two units may be integrated into one unit.

The function, if implemented in a form of software functional unit and sold or used as an independent product, may be stored in a computer readable storage medium. Based on such understanding, the technical solution of the present disclosure, in essence, or the part contributing to the prior art, or the part of the technical solution, may be embodied in the form of a software product, which is stored in a storage medium, and includes several instructions for causing a computer device (which may be a personal computer, a server, or a network device, etc.) to perform all or part of the steps of various implementations of the present disclosure. The aforementioned storage medium includes various media, such as a U disk, a mobile hard disk, a read-only memory (ROM), a random access memory (RAM), a magnetic disk, or an optical disk, which are capable of storing program codes.

What are described above are merely example implementations of the present disclosure, but the protection scope of the present disclosure is not limited thereto. Any variation or substitution that may easily occur to a person skilled in the art within the technical scope disclosed by the present disclosure shall be included within the protection scope of the present disclosure. Therefore, the protection scope of the present disclosure shall be subject to the protection scope of the claims.

What is claimed is:

1. A method for random access, comprising:
sending, by a terminal device, a first message to a network device, the first message comprising a random access preamble and uplink information, the random access preamble occupying at least one first symbol in a time domain, and the uplink information occupying at least one second symbol in the time domain, wherein one said first symbol comprises one first cyclic prefix (CP) and at least one first information segment, and one said second symbol comprises one second CP and at least one second information segments,
wherein each of the at least one second symbol comprises one said second CP and a plurality of identical second information segments, and
wherein a quantity of second information segments in the second symbol is at least one of:
determined based on a quantity of first information segments in the first symbol;
determined based on an identifier of the random access preamble;
determined based on a format corresponding to the random access preamble;
preset according to a standard;
preconfigured by the network device; or
determined according to at least one of a code rate of the uplink information, a modulation and coding scheme (MCS) of the uplink information, or an amount of frequency domain resources of the uplink information.

2. The method according to claim 1, wherein the quantity of the second information segments in the second symbol is determined based on the quantity of the first information segments in the first symbol, wherein
a ratio between the quantity of the second information segments and the quantity of the first information segments is a first preset value; or
a difference between the quantity of the second information segments and the quantity of the first information segments is a second preset value.

3. The method according to claim 1, wherein a quantity of second symbols occupied by the uplink information in the time domain is determined based on a quantity of first symbols occupied by the random access preamble in the time domain; or
a quantity of second symbols occupied by the uplink information in the time domain is determined based on an identifier of the random access preamble; or
a quantity of second symbols occupied by the uplink information in the time domain is determined based on a format corresponding to the random access preamble; or
a quantity of second symbols occupied by the uplink information in the time domain is preset according to a standard or preconfigured by the network device; or
a quantity of second symbols occupied by the uplink information in the time domain is determined according to at least one of a code rate of the uplink information, a modulation and coding scheme (MCS) of the uplink information, or an amount of frequency domain resources of the uplink information.

4. The method according to claim 3, wherein the quantity of the second symbols occupied by the uplink information in the time domain is determined based on the quantity of the first symbols occupied by the random access preamble in the time domain, wherein
a ratio between the quantity of the second symbols and the quantity of the first symbols is a third preset value; or
a difference between the quantity of the second symbols and the quantity of the first symbols is a fourth preset value.

5. The method according to claim 1, wherein a length of the first CP and a length of the second CP are the same.

6. The method according to claim 1, wherein a length of the first CP is greater than a length of the second CP.

7. The method according to claim 1, further comprising:
determining, by the terminal device, a random access transmission format from a plurality of random access transmission formats, wherein at least one of the following is different for different random access transmission formats:
a length of the first CP,
a quantity of second symbols occupied by the uplink information in the time domain, or
a quantity of first information segments in the first symbol and a quantity of second information segments in the second symbol;
wherein sending, by the terminal device, the first message to the network device comprises:
sending, by the terminal device, the first message to the network device according to a determined random access transmission format.

8. The method according to claim 1, wherein a random access transmission format used for sending the first message currently is different from a random access transmission format used for sending the first message at least once previously,
wherein for different random access transmission formats, at least one of the following is different:
a length of the first CP,
a quantity of second symbols occupied by the uplink information in the time domain, or
a quantity of first information segments in the first symbol and a quantity of second information segments in the second symbol.

9. The method according to claim 1, wherein a subcarrier spacing of the random access preamble is the same as a subcarrier spacing of the uplink information.

10. The method according to claim 1, wherein the uplink information comprises at least one of an identifier of the terminal device, a category to which an event triggering Physical Random Access Channel (PRACH) transmission belongs, a scheduling request (SR), a buffer status report (BSR), or service data.

11. A method for random access, comprising:
receiving, by a network device, a first message sent by a terminal device, the first message comprising a random access preamble and uplink information, the random access preamble occupying at least one first symbol in a time domain, and the uplink information occupying at least one second symbol in the time domain, wherein one said first symbol comprises one first cyclic prefix (CP) and at least one first information segment, and one said second symbol comprises one second CP and at least one second information segments,
wherein each of the at least one second symbol comprises one said second CP and a plurality of identical second information segments, and
wherein a quantity of second information segments in the second symbol is at least one of:
determined based on a quantity of first information segments in the first symbol;
determined based on an identifier of the random access preamble;

determined based on a format corresponding to the random access preamble; or determined according to at least one of a code rate of the uplink information, a modulation and coding scheme (MCS) of the uplink information, or an amount of frequency domain resources of the uplink information.

12. The method according to claim 11, wherein the quantity of the second information segments in the second symbol is determined based on the quantity of the first information segments in the first symbol,
wherein a ratio between the quantity of the second information segments and the quantity of the first information segments is a first preset value; or
a difference between the quantity of the second information segments and the quantity of the first information segments is a second preset value.

13. The method according to claim 11, wherein a quantity of second symbols occupied by the uplink information in the time domain is determined based on a quantity of first symbols occupied by the random access preamble in the time domain; or
a quantity of second symbols occupied by the uplink information in the time domain is determined based on an identifier of the random access preamble; or
a quantity of second symbols occupied by the uplink information in the time domain is determined according to at least one of a code rate of the uplink information, a modulation and coding scheme (MCS) of the uplink information, or an amount of frequency domain resources of the uplink information.

14. The method according to claim 13, wherein the quantity of the second symbols occupied by the uplink information in the time domain is determined based on the quantity of the first symbols occupied by the random access preamble in the time domain, wherein
a ratio between the quantity of the second symbols and the quantity of the first symbols is a third preset value; or
a difference between the quantity of the second symbols and the quantity of the first symbols is a fourth preset value.

15. The method according to claim 11, wherein a length of the first CP and a length of the second CP are the same.

16. The method according to claim 11, wherein a length of the first CP is greater than a length of the second CP.

17. The method according to claim 11, further comprising:
determining, by the network device, a random access transmission format from a plurality of random access transmission formats, wherein at least one of the following is different for different random access transmission formats:
a length of the first CP,
a quantity of second symbols occupied by the uplink information in the time domain, or
a quantity of first information segments in the first symbol and a quantity of second information segments in the second symbol; and
sending, by the network device, configuration information to the terminal device, the configuration information comprising a determined random access transmission format.

18. The method according to claim 11, wherein a subcarrier spacing of the random access preamble is the same as a subcarrier spacing of the uplink information.

19. The method according to claim 11, wherein the uplink information comprises at least one of an identifier of the terminal device, a category to which an event triggering Physical Random Access Channel (PRACH) transmission belongs, a scheduling request (SR), a buffer status report (BSR), or service data.

20. A terminal device, comprising a processor, a memory, and a transceiver, wherein the memory is configured to store a computer program and the processor is configured to call and run the computer program stored in the memory to perform:
sending, through the transceiver, a first message to a network device, the first message comprising a random access preamble and uplink information, the random access preamble occupying at least one first symbol in a time domain, and the uplink information occupying at least one second symbol in the time domain, wherein one said first symbol comprises one first cyclic prefix (CP) and at least one first information segment, and one said second symbol comprises one second CP and at least one second information segment,
wherein each of the at least one second symbol comprises one said second CP and a plurality of identical second information segments, and
wherein a quantity of second information segments in the second symbol is at least one of:
determined based on a quantity of first information segments in the first symbol;
determined based on an identifier of the random access preamble;
determined based on a format corresponding to the random access preamble;
preset according to a standard;
preconfigured by the network device; or
determined according to at least one of a code rate of the uplink information, a modulation and coding scheme (MCS) of the uplink information, or an amount of frequency domain resources of the uplink information.

21. The terminal device according to claim 20, wherein the quantity of the second information segments in the second symbol is determined based on the quantity of the first information segments in the first symbol, wherein
a ratio between the quantity of the second information segments and the quantity of the first information segments is a first preset value; or
a difference between the quantity of the second information segments and the quantity of the first information segments is a second preset value.

22. A network device, comprising a processor, a memory and a transceiver, wherein the memory is configured to store a computer program, and the processor is configured to call and run the computer program stored in the memory to perform: receiving, through the transceiver, a first message sent by a terminal device, the first message comprising a random access preamble and uplink information, the random access preamble occupying at least one first symbol in a time domain, and the uplink information occupying at least one second symbol in the time domain, wherein one said first symbol comprises one first cyclic prefix (CP) and at least one first information segment, and one said second symbol comprises one second CP and at least one second information segment,
wherein each of the at least one second symbol comprises one said second CP and a plurality of identical second information segments, and wherein a quantity of second information segments in the second symbol is at least one of:
  determined based on a quantity of first information segments in the first symbol;
  determined based on an identifier of the random access preamble;
  determined based on a format corresponding to the random access preamble; or
  determined according to at least one of a code rate of the uplink information, a modulation and coding scheme (MCS) of the uplink information, or an amount of frequency domain resources of the uplink information.

* * * * *